US010802492B2

(12) United States Patent
Zhang

(10) Patent No.: US 10,802,492 B2
(45) Date of Patent: Oct. 13, 2020

(54) VEHICLE PATH IDENTIFICATION

(71) Applicant: Ford Global Technologies, LLC, Dearborn, MI (US)

(72) Inventor: Linjun Zhang, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 253 days.

(21) Appl. No.: 15/946,039

(22) Filed: Apr. 5, 2018

(65) Prior Publication Data
US 2019/0310644 A1 Oct. 10, 2019

(51) Int. Cl.
*G05D 1/02* (2020.01)
*G05D 1/00* (2006.01)
*G01C 21/34* (2006.01)

(52) U.S. Cl.
CPC ....... *G05D 1/0212* (2013.01); *G01C 21/3453* (2013.01); *G05D 1/0088* (2013.01); *G05D 1/0272* (2013.01); *G05D 1/0285* (2013.01); *G05D 2201/0212* (2013.01)

(58) Field of Classification Search
CPC .. G05D 1/0212; G05D 1/0088; G05D 1/0272; G05D 1/0285; G01C 21/3453
USPC .......................................................... 701/26
See application file for complete search history.

(56) References Cited

U.S. PATENT DOCUMENTS

| 8,392,117 | B2 | 3/2013 | Dolgov et al. |
| 8,504,285 | B2 | 8/2013 | Vepsäläinen |
| 9,283,958 | B2 | 3/2016 | Ulbricht |
| 9,697,730 | B2 | 7/2017 | Thakur et al. |
| 10,060,751 | B1* | 8/2018 | Chen ...................... G01C 21/32 |
| 2005/0267681 | A1 | 12/2005 | Yato |
| 2009/0306881 | A1* | 12/2009 | Dolgov ............... G05D 1/0246 701/28 |
| 2017/0168488 | A1* | 6/2017 | Wierzynski .......... G05D 1/0231 |
| 2018/0173229 | A1* | 6/2018 | Huang .................... H04W 4/70 |
| 2019/0016384 | A1* | 1/2019 | Carlson ............... G05D 1/0274 |
| 2019/0086932 | A1* | 3/2019 | Fan ......................... G08G 1/16 |
| 2019/0196485 | A1* | 6/2019 | Li ...................... B60W 30/0956 |
| 2019/0272446 | A1* | 9/2019 | Kangaspunta .......... G06F 16/29 |
| 2019/0301873 | A1* | 10/2019 | Prasser .................... G06T 7/74 |
| 2019/0317505 | A1* | 10/2019 | Li ........................ G05D 1/0274 |

FOREIGN PATENT DOCUMENTS

| GB | 2409275 B | 12/2006 |
| KR | 101063302 B1 | 9/2011 |

* cited by examiner

*Primary Examiner* — Yazan A Soofi
(74) *Attorney, Agent, or Firm* — Frank A. MacKenzie; Bejin Bieneman PLC

(57) ABSTRACT

A target location from a set of points that define a road can be selected. A path, from a plurality of candidate paths, to the target location, from a current vehicle location outside the set of points, based on a path length, a collision risk, a curvature of the path, and a traffic condition on the road can be selected. The vehicle can be navigated according to the selected path.

18 Claims, 5 Drawing Sheets

VEHICLE PATH IDENTIFICATION

BACKGROUND

Navigation of an autonomous or self-driving vehicle can depend at least in part on digital map data. For example, an autonomous vehicle may include programming to operate by following a route specified according to map data. It is a problem to navigate or operate an autonomous vehicle when the vehicle is at a location that is not described in available map data. Therefore, it is further a problem for an autonomous vehicle to identify and/or navigate from an unmapped location to a mapped location.

DETAILED DESCRIPTION

Introduction

Figure 1:
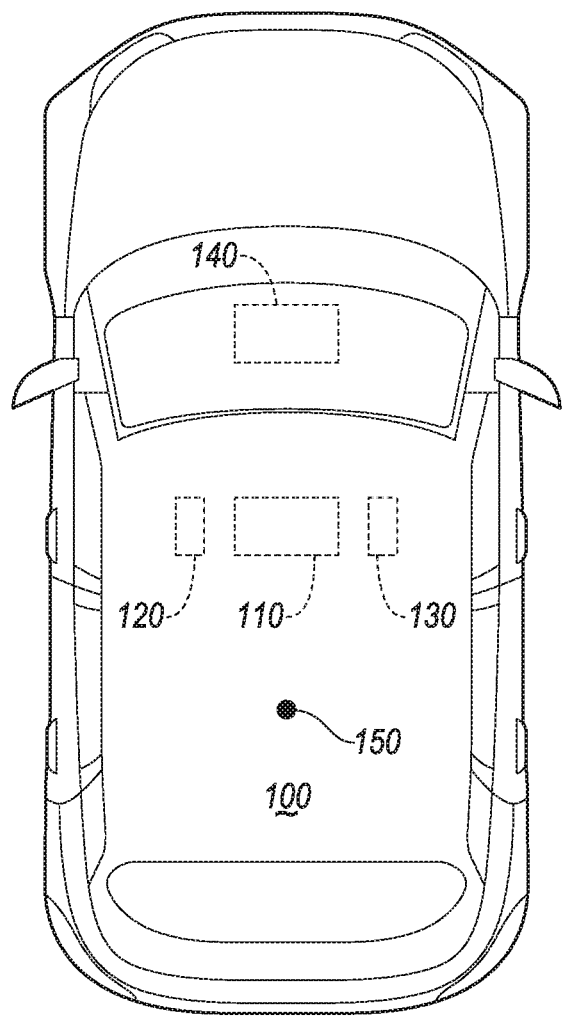
FIG. 1 is a diagram illustrating an example vehicle.

Disclosed herein is a method including selecting a target location from a set of points that define a road, selecting a path, from a plurality of candidate paths, to the target location, from a current vehicle location outside the set of points, based on a path length, a collision risk, a curvature of the path, and a traffic condition on the road, and navigating the vehicle according to the selected path.

The method may further include determining a cost for each of the candidate paths based on a path length, a collision risk, a curvature of the path, and a traffic condition on the road, wherein selecting the path includes evaluating the determined costs.

The method may further include determining the cost for each of the plurality of paths using a mathematical operation including a weight factor associated with each of the path length, the collision risk, the curvature of the path, and the traffic condition on the road.

The selected path may have a minimum determined cost.

Identifying the candidate paths may further include determining a first set of at least two knot points on a straight line between the vehicle location and the target location, identifying a first path to the target location by fitting a first curve between the vehicle location, the target location, and the knot points, iteratively determining a second set of knot points spaced from the first path, and identifying, for each second set of knot points, a second path to the target location by fitting a second curve between the vehicle location, the target location, and the second set of knot points.

The method may further include identifying a nearest target location to the vehicle, wherein a change of vehicle heading from a current vehicle location to the identified nearest target location divided by a distance from the current vehicle location to the nearest target location is less than a curvature threshold.

The change of heading of the vehicle may be a sum of a first angle between the vehicle heading and a line connecting a vehicle reference point to the target location and a second angle between the line and a target heading of the vehicle at the target location.

The method may further include upon determining that a minimum cost exceeds a predetermined threshold, identifying a second target location on the road based on an object and a heading of the vehicle, identifying a second plurality of paths from the vehicle location to the second target location, determining a cost for each of the second plurality of paths based on the path length, the collision risk, the curvature of the path, the traffic condition on the road, and selecting a second path from the plurality of path, and navigating the vehicle to follow the selected second path.

The method may further include selecting the path, from the plurality of candidate paths, to the target location, from the current vehicle location outside the set of points further based on a curvature rate of the path.

Further disclosed herein is a system including a processor and a memory. The memory stores instructions executable by the processor to select a target location from a set of points that define a road, select a path, from a plurality of candidate paths, to the target location, from a current vehicle location outside the set of points, based on a path length, a collision risk, a curvature of the path, and a traffic condition on the road, and navigate the vehicle according to the selected path.

The instructions may include further instructions to determine a cost for each of the candidate paths based on the path length, the collision risk, the curvature of the path, and the traffic condition on the road, and to select the path by evaluating the determined costs.

The instructions may include further instructions to determine the cost for each of the plurality of paths using a mathematical operation including a weight factor associated with each of the path length, the collision risk, the curvature of the path, and the traffic condition on the road.

The selected path may have a minimum determined cost.

The instructions to identify the candidate paths may include further instructions to determine a first set of at least two knot points on a straight line between the current vehicle location and the target location, identify a first path to the target location by fitting a first curve between the vehicle location, the target location, and the knot points, iteratively determine a second set of knot points spaced from the first path, and identify, for each second set of knot points, a second path to the target location by fitting a second curve between the vehicle location, the target location, and the second set of knot points.

The instructions may include further instructions to identify a nearest target location to the vehicle, wherein a change of vehicle heading from the current vehicle location to the identified nearest target location divided by a distance from a vehicle location to the nearest target location is less than a curvature threshold.

The change of heading of the vehicle may be a sum of a first angle between the vehicle heading and a line connecting a vehicle reference point to the target location and a second angle between the line and a target heading of the vehicle at the target location.

The instructions may include further instructions to upon determining that a minimum cost exceeds a predetermined threshold, identify a second target location on the road based on an object and a heading of the vehicle, identify a second plurality of paths from the vehicle location to the second target location, determine a cost for each of the second plurality of paths based on the path length, the collision risk, the curvature of the path, and the traffic condition on the road, and select a second path from the plurality of path; and navigate the vehicle to follow the selected second path.

The instructions may include further instructions to select the path, from the plurality of candidate paths, to the target location, from the current vehicle location outside the set of points further based on a curvature rate of the path.

Further disclosed is a computing device programmed to execute any of the above method steps.

Yet further disclosed is a computer program product, comprising a computer readable medium storing instructions executable by a computer processor, to execute any of the above method steps.

Exemplary System Elements

A vehicle computer may be programmed to select a target location from a set of points that define a road, and to select a path from a plurality of candidate paths to the selected target location. The path may be from a first location of the vehicle outside the road, e.g., in an unmapped area, to the target location on the road. The computer may select the path based on a path length, a collision risk, a curvature of the path, and a traffic condition on the road. The vehicle computer can be further programmed to navigate the vehicle according to the selected path. The computer may be programmed to actuate vehicle actuator(s) to follow the determined path by actuating one or more vehicle actuators.

FIG. 1 illustrates a vehicle 100. The vehicle 100 may be powered in a variety of known ways, e.g., with an electric motor and/or internal combustion engine. The vehicle 100 may be a land vehicle such as a car, truck, etc. A vehicle 100 may include a computer 110, actuator(s) 120, sensor(s) 130, and a human machine interface (HMI 140). A vehicle 100 has a reference point 150, i.e., a specified point within the space defined by the vehicle body, e.g., a geometrical center point at which respective longitudinal and lateral center axes of the vehicle 100 intersect.

The computer 110 includes a processor and a memory such as are known. The memory includes one or more forms of computer-readable media, and stores instructions executable by the computer 110 for performing various operations, including as disclosed herein.

The computer 110 may operate the vehicle 100 in an autonomous or a semi-autonomous mode. For purposes of this disclosure, an autonomous mode is defined as one in which each of vehicle 100 propulsion, braking, and steering are controlled by the computer 110; in a semi-autonomous mode the computer 110 controls one or two of vehicles 100 propulsion, braking, and steering.

The computer 110 may include programming to operate one or more of land vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via a vehicle 100 communications bus as described further below, more than one processor, e.g., controllers or the like included in the vehicle for monitoring and/or controlling various vehicle controllers, e.g., a powertrain controller, a brake controller, a steering controller, etc. The computer 110 is generally arranged for communications on a vehicle communication network that can include a bus in the vehicle such as a controller area network (CAN) or the like, and/or other wired and/or wireless mechanisms.

Via the vehicle 100 network, the computer 110 may transmit messages to various devices in the vehicle and/or receive messages from the various devices, e.g., an actuator 120, an HMI 140, etc. Alternatively or additionally, in cases where the computer 110 actually comprises multiple devices, the vehicle 100 communication network may be used for communications between devices represented as the computer 110 in this disclosure. Further, as mentioned below, various controllers and/or sensors may provide data to the computer 110 via the vehicle communication network.

In addition, the computer 110 may be configured for communicating through a wireless vehicular communication interface with other traffic participants (e.g., vehicles, infrastructure, pedestrian, etc.), e.g., via a vehicle-to-vehicle communication network and/or a vehicle-to-infrastructure communication network. The vehicular communication network represents one or more mechanisms by which the computers 110 of vehicles 100 may communicate with other traffic participants, and may be one or more of wireless communication mechanisms, including any desired combination of wireless (e.g., cellular, wireless, satellite, microwave and radio frequency) communication mechanisms and any desired network topology (or topologies when multiple communication mechanisms are utilized). Exemplary vehicular communication networks include cellular, Bluetooth, IEEE 802.11, dedicated short range communications (DSRC), and/or wide area networks (WAN), including the Internet, providing data communication services.

The vehicle 100 actuators 120 are implemented via circuits, chips, or other electronic and or mechanical components that can actuate various vehicle subsystems in accordance with appropriate control signals as is known. The actuators 120 may be used to control braking, acceleration, and steering of the vehicles 100.

The sensors 130 may include a variety of devices known to provide data to the computer 110. For example, the sensors 130 may include Light Detection And Ranging (LIDAR) sensor(s) 130 disposed on a top of the vehicle 100 that provide relative locations, sizes, and shapes of objects 200a, 200b surrounding the vehicle 100, including moving objects 200b, e.g., second vehicles travelling next to or behind of the vehicle 100 (see FIG. 2), and/or static objects 200a, e.g., a bridge, guardrail, vegetation, building, river, ditch, etc. As another example, one or more radar sensors 130 fixed to vehicle 100 bumpers may provide locations of the objects 200a, 200b relative to the location of the vehicle 100. The sensors 130 may include camera sensor(s) 130, e.g. to provide a front view, side view, etc., providing images from an area surrounding the vehicle 100. For example, the computer 110 may be programmed to receive image data from a camera sensor(s) 130 and to implement image processing techniques to detect a road 220, lane markings 230, etc. The computer 110 may be further programmed to determine a current vehicle 100 location based on location coordinates, e.g., GPS coordinates, received from a vehicle 100 location (e.g., GPS) sensor 130. As another example, the computer 110 may be programmed to receive data including relative speed, location coordinates, and/or heading of other vehicles via the wireless communication network. For example, the computer 110 may receive such data from location sensors disposed in other vehicles that provides geographical coordinates, movement direction, etc., of the second vehicles The HMI 140 may be configured to receive information from a user, such as a human operator, during operation of the vehicle 100. Moreover, a HMI 140 may be configured to present information to the user. Thus, a HMI 140 may be located in the passenger compartment of the vehicle 100. In one example, the computer 110 may be programmed to receive from the HMI 140 information indicating a request to find a path 270 to a target location 280 on a road 220.

Figure 2:
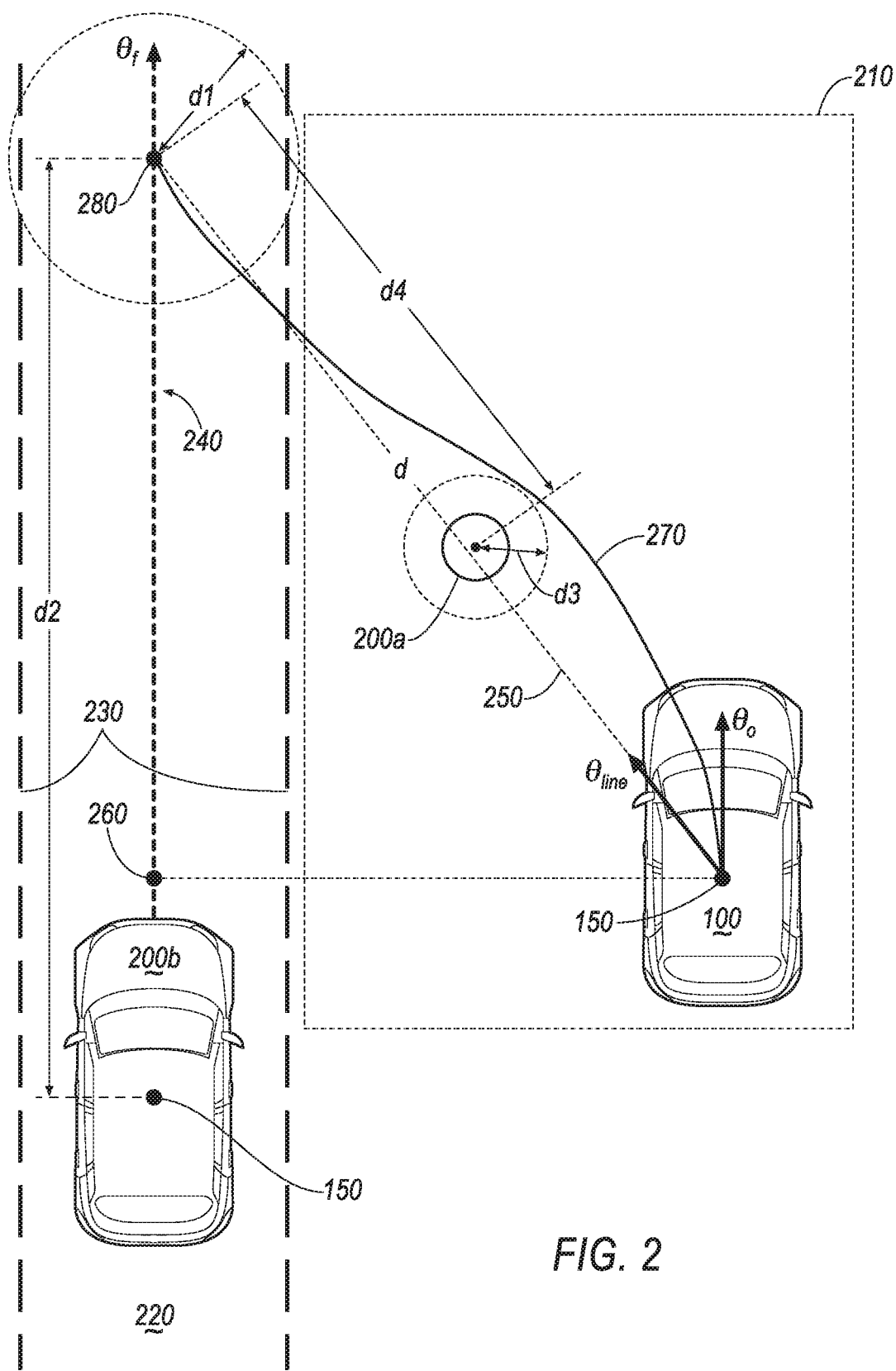
FIG. 2 is a diagram showing the vehicle of FIG. 1 moving on a path to a target location on a road.

FIG. 2 shows the vehicle 100 and objects 200a, 200b on a road 220. The vehicle 100 may be located outside the road 220 in an area 210, e.g., a road 220 shoulder area, a parking area, a private road, etc. The computer 110 may be programmed to identify a vehicle 100 destination, e.g., inputted via the HMI 140, and to plan a vehicle 100 route to the destination based on data received from the vehicle 100 sensors 130 and digital map data, e.g., received via a vehicle-to-infrastructure communication network.

A map, in the present context, is data in a digital format that includes location coordinates such as global positioning system (GPS) coordinates of points 240 that represent physical structures such as roads 220, intersections, traffic signs, buildings, guardrails, etc., and/or height of points on outer surfaces of road 220 features such as buildings, traffic signs, vegetation, etc. Digital map data typically represent a road 220 by a plurality of points (or waypoints) 240 along a centerline of the road 220 lane. A centerline is typically an imaginary line in a longitudinal direction of a road 220 lane having a same lateral distance to a right and a left edge of the road 220 lane. Thus, a multi-lane road 220 may have multiple centerlines, i.e., one centerline per each road 220 lane.

However, the received map data will lack data associated with an unmapped area 210, e.g., an area that does not include points 240 of a road 220. Thus, for example, a problem arises when the vehicle 100 is at a location within an unmapped area 210 and it is desired to navigate to a point 240 on a road 220, e.g., when navigating the vehicle 100 from a road 220 shoulder, private parking space, etc. to the road 220.

The computer 110 can be programmed to select a target location 280 from a set of points 240 that define the road 220, and to select a path 270 from a plurality of candidate paths 270 (see FIG. 3) to the target location 280 from a current vehicle 100 location outside the set of points 240, based on a path 270 length, a collision risk, a curvature (and/or a curvature rate) of the path 270, and a traffic condition on the road 220. The computer 110 can be further programmed to navigate the vehicle 100 according to the selected path 270. The computer 110 may be programmed to actuate vehicle 100 actuator(s) 120 to follow the determined path 270 by actuating one or more vehicle 100 actuators 120 including propulsion, braking, and/or steering actuators 120.

In the present context, a "location outside the set of points 240" is a location for which map lacks data. Further, a vehicle 100 location may be deemed to be outside the set of points 240 when beyond a specified distance, e.g., 10 meters, of the location.

A "traffic condition", in the present context, specifies a state of traffic on a road 220 and includes a traffic restriction and/or a traffic density. A traffic restriction is a restriction on vehicle 100 movement, e.g., a direction, a speed, object etc., based on traffic rules, a weather condition, etc. In one example, the received map data may include traffic restrictions associated with points 240 of roads 220. A traffic density is a density of land vehicles on a road 220. In one example, the traffic density is defined as average distance between two consecutive vehicles on a road 220 lane, e.g., 15 m. In another example, a traffic density is a number of vehicles per units of road 220 length, e.g., 100 vehicles/kilometer. In yet another example, a traffic density is defined based on a number of vehicles on a road 220 surface and/or average speed of vehicles. In one example, the computer 110 may be programmed to receive traffic density data from a remote computer, e.g., received from a traffic monitoring computer via the wireless vehicle-to-infrastructure communication network. Additionally or alternatively, the computer 110 may be programmed to estimate traffic density data based on data received from vehicle 100 sensors 130, e.g., a camera sensor 130, and/or wireless communication network, e.g., including location coordinates and/or heading of other vehicles within a specified distance of the vehicle 100.

In order to navigate the vehicle 100 to a point 240 on the road 220, the computer 110 may be programmed to identify a nearest target location 280 to the vehicle 100. The computer 110 may be constrained to select a path 270 based on a constraint (1) such that a change of vehicle 100 heading from a current vehicle 100 location to the identified nearest target location 280 divided by a distance d from the vehicle 100 location to the nearest target location 280 is less than a curvature threshold $k_t$, e.g., $$\frac{1}{30} \ [1/m].$$

$$\frac{|\theta_f - \theta_{line}| + |\theta_{line} - \theta_o|}{d} < k_t \quad (1)$$

In the present context, a "curve" (or curved line) is a line with a finite radius, whereas a "straight line" is a line with an infinite radius. As an example, a curvature κ may be specified with κ=dθ/ds, i.e., a variation of heading dθ along a length ds in units of radians/meter (rad/m). Moreover, a curvature rate is a derivative of curvature with respect to a length specified as dκ/ds in units of $rad/m^2$. The curvature threshold $k_t$ may be determined based on a vehicle 100 steering attributes. This is, as will be understood, vehicle 100 attributes such as vehicle 100 steering attributes, vehicle 100 dimensions, etc. may limit how sharp a vehicle 100 can turn (or change direction). Thus, the curvature threshold $k_t$ may be defined based on a mechanical design of the vehicle 100. Moreover, attaching a mechanical accessory such as a trailer to the vehicle 100 may modify, e.g., reduce, a curvature threshold associated with the vehicle 100. Smaller curvature rates can improve occupant comfort as opposed to larger or higher curvature rates.

The computer 110 may be programmed to identify a nearest target location 280 by starting a search for the target location 280 from a projection location 260 and then continuing the search in a direction of travel of the road 220. The projection location 260 can be a nearest point to the vehicle 100 reference point 150, e.g., an intersection of the road 220 centerline and a line passing through the vehicle 100 reference point 150 that is perpendicular to the road 220. The direction of travel may be determined based on map data, e.g., including traffic restriction posing limitation of direction of travel, a predetermined vehicle 100 route, etc. The computer 110 may be programed to identify the nearest target location 280 based on the constraint (1). For example, the nearest target location 280 is a point 240 spaced from the projection location 260 in the direction of travel that meets constraint (1) above. The target location 280 is a nearest point 240 to the projection location 260 among a plurality of points 240 that meet constraint (1).

The change of heading of the vehicle 100 upon a move from the vehicle 100 location to the target location 280 is a sum of a first angle between the vehicle 100 heading $\theta_o$, and a heading $\theta_{line}$ of a straight line 250 connecting the vehicle 100 reference point 150 to the target location 280, and a second angle between the line $\theta_{line}$ and a target heading $\theta_f$ of the vehicle 100 at the target location 280. The distance d represents a length of the direct line 250.

The target heading $\theta_f$ may be determined based on a direction of the road 220 and a planned route of the vehicle 100. In one example, the target heading $\theta_f$ may be same as a longitudinal direction of the road 220 at the target location 280, e.g., a tangent line to the centerline curve of the road 220 in the direction of travel. In another example (not shown in FIG. 2), the target heading $\theta_f$ may be in an opposite direction compared to the heading $\theta_f$ shown in FIG. 2, if a vehicle 100 route includes travelling in an opposite direction of the road 220.

As discussed above, the computer 110 may be programmed to identify the target location based on a collision risk, e.g., a risk of collision with an object 200a, 200b. For example, the straight line 250 from the vehicle 100 location to the target location 280 may be blocked by a static object 200a, e.g., guardrail, vegetation, landscaping, etc., and/or a moving object 200b.

The computer 110 may be programmed to determine the object 200a, 200b based on data received from at least one of a vehicle 100 sensor 130 and a vehicle-to-vehicle communication interface. Thus, the computer 110 may be programmed to identify the target location 280 based on an object, e.g., an object 200a in the unmapped area 210, the second vehicle object 200b on the road 220, etc., and the heading $\theta_o$ of the vehicle 100. The computer 110 may be programmed to identify the target location 280 based on an object 200a, 200b by identifying an object location (e.g., static object 200a location, second vehicle object 200b location, etc.) and determining the target location 280 that is accessible for the vehicle 100 from the vehicle 100 location. In the context of identifying the target location 280, the term "accessible" means there is no object 200a, 200b within a specified distance $d_1$, e.g., 10 meters (m), of the target location 280. In one example, the target location 280 is accessible with respect to the static object 200a, because a distance $d_4$ of the static object 200a to the target location 280 exceeds the distance threshold $d_1$. In another example, a distance $d_2$ of a moving object 200b may change relative to the target location 280. In one example, "accessible" further means that a distance $d_2$ of the moving object 200b to the target location 280 is expected to be greater than the distance threshold $d_1$ until an expected arrival of the vehicle 100 at the target location 280. The computer 110 may be programmed to determine the expected arrival time of the vehicle 100 at the target location 280 based on a moving object 200b speed and direction, the distance d of the vehicle 100 to the target location 280, and an expected acceleration of the vehicle 100 to move to the target location 280. Thus, the computer 110 may be programmed to determine, based on the expected arrival time of the vehicle 100 at the target location 280, that the target location 280 is accessible with respect to the moving object 200b, upon determining a new distance $d_2$ of the moving object 200b to the target location 280 at the expected arrival time is greater than the distance threshold $d_1$. Additionally or alternatively, "accessible" may mean that no point on the line 250 connecting the vehicle 100 location and the target location 280 is within a distance threshold $d_3$ of an object 200a. For example, the example line 250 shown in FIG. 2 is not accessible, based on this alternative meaning of "accessible." In the context of identifying the path 270 to the target location 280, the term "accessible" is discussed further below.

Figure 3:
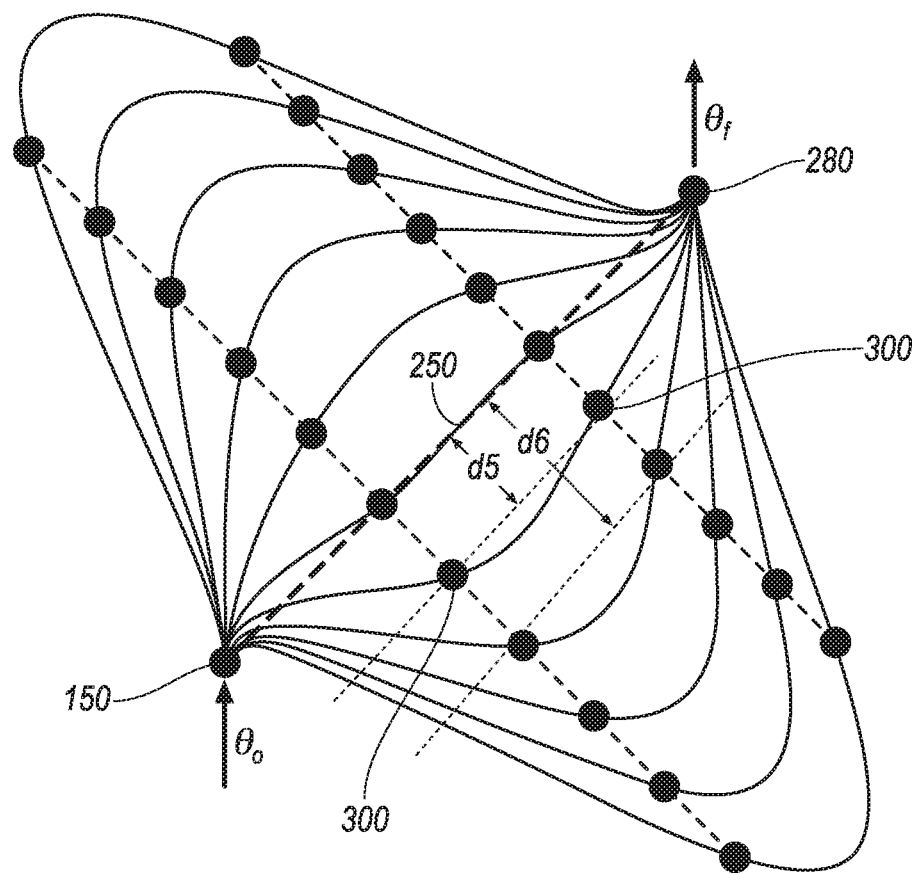
FIG. 3 is an exemplary graph showing multiple candidate paths for the vehicle of FIG. 1 to reach a target location on the road.

With reference to FIG. 3, the computer 110 may be programmed to identify a plurality of candidate paths 270 by determining a first set of at least two knot points 300 on the straight line 250 between the vehicle 100 location and the target location 280, identifying a first path 270 to the target location 280 by fitting a first curve between the vehicle 100 location, the target location 280, and the knot points 300, iteratively determining a second set of knot points 300 spaced from the first path 270, and identifying, for each second set of knot points 300, a second path 270 to the target location 280 by fitting a second curve between the vehicle 100 location, the target location 280, and the second set of knot points 300. In the present context, a knot point 300 is a point that, with other knot points 300, substantially defines a path 270. In other words, the knot point 300 is a point through which a curve (i.e., a respective path 270) can be fitted to pass. Thus, moving one or more knot points 300 may change a path 270 that is defined based on, i.e., fitted to, the moved knot points 300. In the present context, "iteratively," consistent with the plain and ordinary meaning of that term, means repeating the process of determining a second set of knot points 300 spaced from the first path 270, as discussed below. In the present context, a path 270 on the ground surface can be represented as a combination of one or more curves and/or straight lines. In other words, a straight path 270 is a path 270 that includes a straight line, a curved path 270 may include one or more curves that are connected to one another, i.e., each curve or straight line in the path 270 either shares an endpoint with another curve or straight line or has an endpoint that is a starting or ending point (e.g., a point defining a target location 280) of the path 270.

The computer 110 may be programmed to generate the plurality of candidate paths 270 through spline interpolation of knot points 300. Spline interpolation is a conventional interpolation technique that uses low-degree polynomials and chooses polynomial pieces such that they fit smoothly together. Interpolation, as is well-known, can mean identifying new data points within a range of a discrete set of known data points, e.g., vehicle 100 location, the target location 280, and the knot points 300. The resulting function of spline interpolation is called a spline which, in the present context, represents a candidate path 270.

As discussed above and shown in FIG. 3, a first set of two knot points 300 may be on the straight line 250 that connects the vehicle 100 location to the target location 280. In other words, first candidate path 270 may be identical to the straight line 250 connecting the vehicle 100 location to the target location 280. Two data points nearest to one another determine a segment between one another. For example, the knot points 300 on the straight line 250 may be selected such that the segments between adjacent data points are equal, e.g., one third of the distance d. A number of data points (e.g., 4 data points as shown in FIG. 3) may determine a flexibility of a candidate path 270. Flexibility of a path 270, in the present context, is related to a number of knots 300 included in the path 270. A larger number of knots 300 in a path 270 can increase a flexibility of the path 270. In other words, a path 270 with more knots 300 is typically more flexible than a path 270 with fewer knots 300. Increased flexibility typically increases a likelihood of finding a path 270 around obstacles 200a, 200b to reach the target location 280. For example, a path 270 that has a number of curves, e.g., that "zig-zags," may have more knot points 300 as compared to a number of knot points 300 defining a substantially straight path 270. In other words, by having more knot points 300, it may be easier to find a path 270 around objects 200a, 200b to reach the target location 280. Alternatively, higher number of knot points 300, e.g., 3 knot points 300, may be selected which results in higher order splines to connect the data points. Higher order spline interpolation improves a smoothness of a path 270. In the present context, smoothness is a measure of evaluating a curvature rate of a candidate path 270, i.e., the lower the curvature rate the smoother the path 270.

As one example, to generate the candidate paths 270, the computer 110 may be programmed to use optimization techniques such as a stochastic optimization technique, e.g., particle swarm optimization (PSO), to move the location of knot points 300 in order to find an optimized path (i.e., lowering a cost of the path 270). Typically, a PSO is initialized with a population of random solutions, e.g., a population of random candidate paths 270, and then a search for an optimum, e.g., an optimal path 270, is performed by updating the generations of the population, e.g., updating the population of the randomly generated candidate paths 270. A generation refers to a plurality of candidate paths 270 determined based on generated sets of knot points 300. Generating a new generation means generating a new plurality of candidate paths 270. In one example, the computer 110 may be programmed to initiate generating a new generation of candidate paths 270, unless a number of generations exceeds a predetermined threshold, e.g., 10 generations.

The population of PSO may evolve by changing the locations of the knot points 300. "Evolving," in the present context, refers to changes to the paths 270, e.g., the knot points 300 location, from one generation to a next generation. The computer 110 may be programmed to, iteratively, determine a second set of knot points 300. In one example, the computer 110 may be programmed to determine a second set of knot points 300 with a lateral distance 4:15 to the straight line 250, a third set of knot points 300 with a lateral distance $d_6$ to the straight line 250, etc. In one example, the computer 110 may be programmed to determine the distance $d_6$ relative to the distance 4:15, etc., e.g., the distance $d_6$ may be two times distance 4:15. Additionally or alternatively, the computer 110 may be programmed to adjust a longitudinal and/or lateral location of the knot points 300 to determine a new set of knot points 300. In one example, to reduce a volume of computation, the computer 110 may be programmed to determine a new set of knot points 300 at least by a predetermined lateral distance, e.g., 3 meters (m), spaced from a nearest set of knot points 300 (i.e., $d_6$-$d_5$>3 m).

The heading $\theta_o$ of the vehicle 100 at the first location and an expected heading $\theta_f$ of the vehicle 100 at the target location 280 may be used as boundary conditions such that the candidate paths 270 are aligned with the headings $\theta_o$, $\theta_f$ at the first location and the expected target location 280. In other words, the computer 110 may be programmed to pose the boundary conditions as constraints while identifying the candidate paths 270, i.e., any identified candidate path 270 may leave the vehicle 100 first location with a heading $\theta_o$ and arrive at the target location 280 with the expected heading $\theta_f$.

Additionally, the computer 110 may be programmed to determine knot points 300 based on locations of objects 200a, 200b. For example, the computer 110 may be programmed to determine the knot points 300 such that no knot point 300 is placed within a predetermined distance $d_3$ of an object 200a.

After determining the plurality of candidate paths 270, the computer 110 may be programmed to select, as discussed below, a path 270 from the candidate paths 270. The computer 110 may be programmed to determine a cost for each of the candidate paths 270 based on a path 270 length, a collision risk, a curvature, a curvature rate of the path 270, and a traffic condition on the road 220. The computer 110 may be programmed to select the path 270 based on evaluating the determined costs of the candidate paths 270.

$$J = l + w_2 \Sigma_{i=1}^{n} + w_2 \Sigma_{i=1}^{n} |k_i| + w_3 {}_{i=1,\ldots,n}^{max} |k_i| + w_4 \Sigma i = 1^n |k'_i| + w_5{}_{i=1,\ldots,n} \max |k'_i| + w_6 T \quad (2)$$

The computer 110 may be programmed to determine the cost for each of the plurality of paths 270 using a mathematical operation (2) including weight factor $w_1, \ldots w_6$ associated with each of the path 270 length, the collision risk, the curvature of the path, the curvature rate of the path, and the traffic condition on the road. In other words, a cost J is determined for each of the plurality of candidate paths 270. Each path 270 may include a number n of path points. Parameter l represents a length of a path 270. In one example, the path points may be spaced equally, e.g., 0.5 m. Thus, a number of path points of a path 270 may depend on a length l of the path 270. Parameters $k_i$ and $k'_i$ represent a curvature of the $i^{th}$ path point of the path 270 and a curvature rate with respect to a length of a path 270. The first term of the operation (2) is considered to find the shortest path, because increasing a length l of a path 270, accordingly increases its cost. The second term is used for reducing collision risk. In the present context, "the $i^{th}$ path point is in collision" means the path point is within, e.g., a predetermined distance $d_3$, of an object 200a, 200b. Operation (3) defines a value of c, for each segment of the respective path 270. Other terms (i.e., $3^{rd}$ to $6^{th}$ terms) are included for feasibility, comfort, and traffic condition of the path 270. In one example, the traffic condition may be specified as a number of vehicles per each kilometer length of the road 220 in units of km$^{-1}$. For example, sharper turns on the path 270 increase a cost of a path 270, and thus reduce a likelihood of selecting that path 270.

$$c_i = \begin{cases} 1, & \text{if the } i\text{-}th \text{ path point is in collision} \\ 0, & \text{otherwise} \end{cases} \quad (3)$$

The positive weight constants $w_1, \ldots, w_5$ determine the weight corresponding in the cost, while the weight of the path 270 length l, in example operation (2), is 1 (one). While safety is typically more important than comfort, the value of $w_1$ may be larger than other weights $w_2, \ldots, w_5$. Table 1 shows example values for the weights $w_1, \ldots, w_5$.

TABLE 1

| Parameter | Value |
| --- | --- |
| n | 4 |
| $w_1$ | 2000 |
| $w_2$ | 10 [m] |
| $w_3$ | 500 [m] |
| $w_4$ | 20 [m$^2$] |
| $w_5$ | 500 [m$^2$] |
| $w_6$ | 0.05 [km$^{-1}$] |

TABLE 1-continued

| Parameter | Value |
| --- | --- |
| $c_1$ | 1.5 |
| $c_2$ | 2 |
| $w_{vel}^0$ | 1 |
| $w_{damp}$ | 0.98 |
| $v_{min}$ | −10 |
| $v_{max}$ | 10 |

The computer 110 may be programed to select the path 270 with a minimum cost J. In other words, the computer 110 may be programmed to select the path 270 from the candidate paths 270 which has the minimum cost J.

With reference to Table 1, the computer 110 may be programmed to update (or move) the location of the knot points 300, e.g., based on operations (4). Parameters $C_{P_i}{}^K$, and $C_{L_i}{}^K$ represent knot points 300 stored in particle $P_i{}^K$, local optimum $L_i{}^K$, and global optimum $G^K$, which may be represented by matrices including, e.g., location coordinates of knot points 300, optimum points, etc. Initial values may be defined based on the initial set of generated knot points 300, as discussed above. Parameter K denotes an index of the generations. Velocity $v_i{}^k$, in the context of PSO, is a parameter used to move (i.e., evolve) the position or location of a particle (e.g., a candidate path 270) to search for an optimal solution (e.g., a low-cost path 270). For example, FIG. 3 shows 11 particles included in the PSO. In other words, each path 270 may represent a particle of the PSO. The computer 110 may be programmed to determine the velocity $v_i{}^k$ based on operation (5) below.

$$C_{P_iK+1} = C_{P_iK} + v_i^k \quad (4)$$

$$v_i^k = w_{vel}^k \cdot v_i^{k-1} + c_1(C_{L_i}{}^K - C_{P_i}{}^K) + c_2(C_G{}^K - C_{P_i}{}^K) \quad (5)$$

Table 1 shows example values for multipliers $c_1$ and $c_2$. The computer 110 may be programmed to determine a weight $w_{vel}^k$ based on operation (6). Operation (7) shows a mathematical constraint for $w_{damp}$. Table 1 shows an example value of $w_{damp}$. Operation (8) shows a mathematical constraint of $v_i{}^k$. Table 1 shows example values for $v_{min}$ and $v_{max}$.

$$w_{vel}^k = w_{vel}^{k-1} \cdot w_{damp} \quad (6)$$

$$0 < w_{damp} < 1 \quad (7)$$

$$v_{min} < v_i^k < v_{max} \quad (8)$$

As discussed above, the computer 110 may be programmed to determine a cost of each candidate path 270 and select the path 270 with a minimum cost. However, in some examples, the path 270 with the minimum cost may have a cost that exceeds a maximum cost threshold, e.g., no collision-free path 270 may be identified to an identified target location 280, although a maximum number of generations of PSO is reached. In other words, after evolving the population of paths 270, none of the paths 270 may have a cost less than a predetermined cost threshold. In such examples, the computer 110 may be programmed to determine a new target location 280 and to proceed with repeating the process of generating candidate paths 270 and search for a path 270 to the new target location 280 which has a cost less than the predetermined maximum cost. In other words, the computer 110 may be programmed to identify, upon determining that a minimum cost exceeds a predetermined threshold, a second target location 280 on the road 220 based on an object 200a, 200b and a heading $\theta_o$ of the vehicle 100. The computer 110 may be programmed to identify a second plurality of paths 270 from the vehicle 100 location to the second target location 280 and to determine a cost for each of the second plurality of paths 270 based on a path 270 length l, a collision risk, a curvature of the path 270, a traffic condition on the road. The computer 110 may be further programmed to select a second path 270 from the plurality of paths 270 and to navigate the vehicle 100 to follow the selected second path 270.

Processing

Figure 4A:
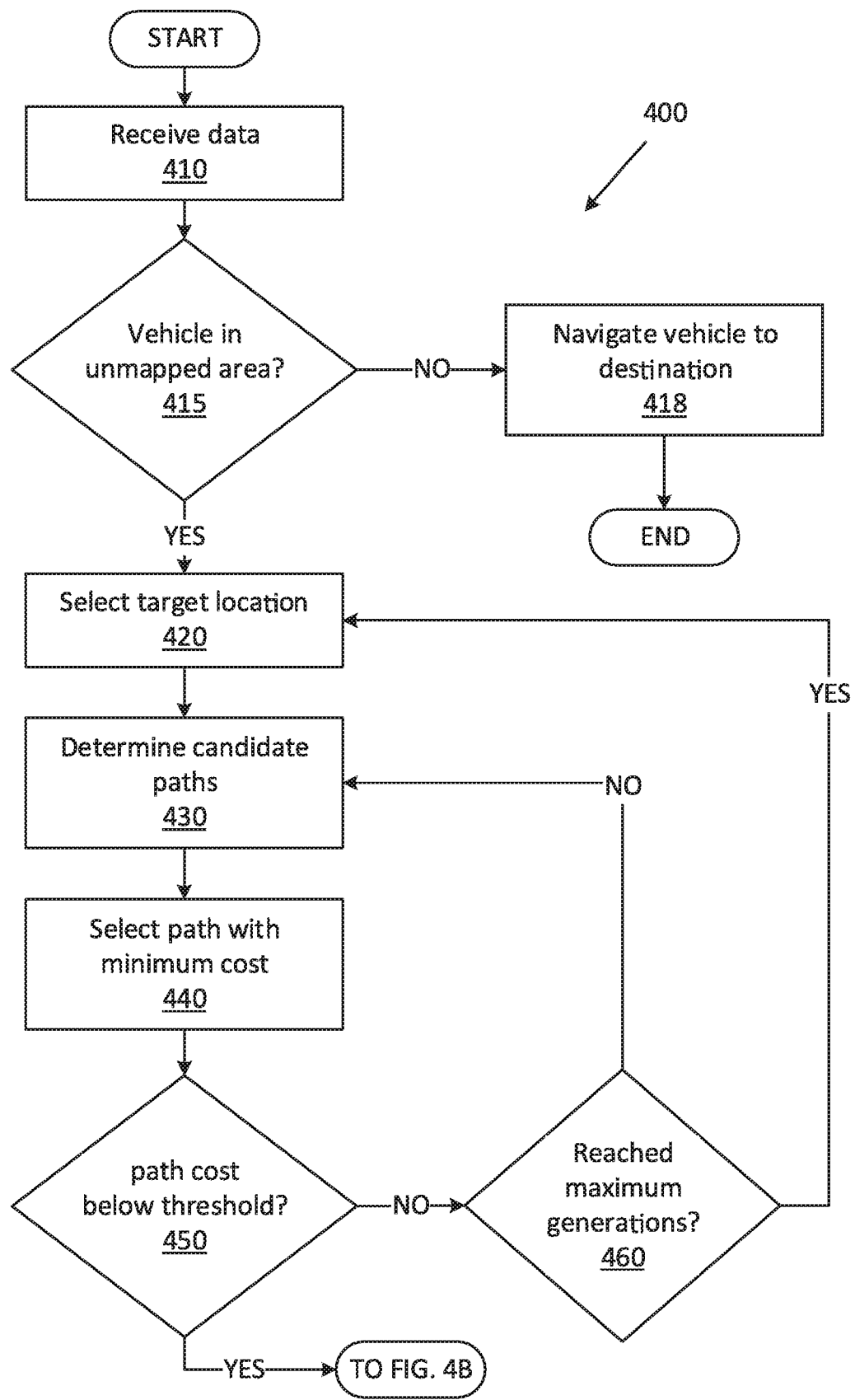
FIGS. 4A-4B are a flowchart of an exemplary process for identifying a path and navigating the vehicle on the identified path.
Figure 4B:
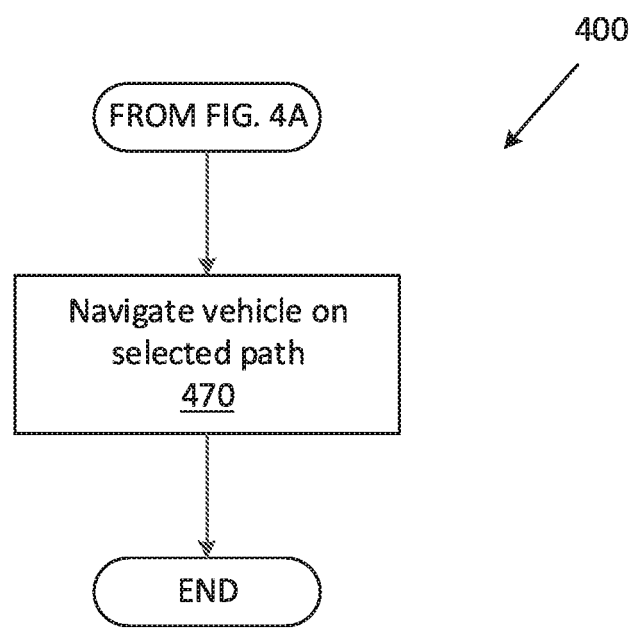

FIGS. 4A-4B are a flowchart of an exemplary process 400 for identifying a path 270 and navigating the vehicle 100 on the identified path 270. The vehicle 100 computer 110 may be programmed to execute blocks of the process 400.

With reference to FIG. 4A, the process 400 begins in a block 410, in which the computer 110 receives data. The computer 110 may be programmed to receive map data, sensor data, e.g., from the LIDAR sensor 130, a planned route data of the vehicle 100 and/or a vehicle 100 destination.

Next, in a decision block 415, the computer 110 determines whether the vehicle 100 is in an unmapped area 210. The computer 110 may be programmed to determine whether the vehicle 100 is in an unmapped area 210 based on map data including points 240 and location coordinates of the vehicle 100, e.g., received from a vehicle 100 sensor 130 such as GPS sensor 130. If the computer 110 determines that the vehicle 100 is in an unmapped area 210, then process 400 proceeds to a block 420; otherwise the process 400 proceeds to a block 418.

In the block 418, the computer 110 operates the vehicle 100 based on digital map data, e.g., navigates the vehicle 100 to a vehicle 100 destination along a route that is mapped by the digital map data, e.g., received via the HMI 140. The computer 110 may be programmed to navigate the vehicle 100 to the destination by actuating vehicle 100 actuators 120, e.g., propulsion, steering, braking actuators 120.

In the block 420, the computer 110 selects a target location 280. As described above, the computer 110 may be programmed to identify the road 220 based on the vehicle 100 planned route and/or vehicle 100 sensor 130 data. The computer 110 may be programmed to then select the target location 280 on a road 220 lane based on the sensor 130 data, the vehicle 100 heading $\theta_o$, location of objects 200a, 200b, etc. If this block is reached from a decision block 460, the computer 110 may be programmed to identify a target location 280 spaced away from a previously identified target location 280 in a direction of travel based at least in part on the location of objects 200a, 200b.

Next, in a block 430, the computer 110 may be programmed to determine a plurality of candidate paths 270 from a vehicle 100 first location, e.g., in an unmapped area 210, to the identified target location 280. The computer 110 may be programmed to determine the candidate paths 270 based on a stochastic optimization technique such as PSO, as described with respect to FIG. 3. The computer 110 may be programmed to update previously generated candidate paths 270 by generating a new generation of candidate paths 270 to identify lower cost paths 270 to the target location 280.

Next, in a block 440, the computer 110 selects a path 270 from the plurality of the candidate paths 270 which has a minimum cost. The computer 110 may be programmed to determine a cost J of each path 270, e.g., using an example operation (4), based on a respective path 270 length l, object 200a, 200b location, curvature, etc. The computer 110 may be programmed to select the path 270 with a minimum cost from the plurality of candidate paths 270 (or randomly selects a path 270 from more than one minimum cost paths 270).

Next, in a decision block 450, the computer 110 determines whether the selected path 270 has a cost that is below a predetermined cost threshold. If the computer 110 determines that the cost of the selected path 270 is below the threshold, then the process 400 proceeds to a block 470 (see FIG. 4B); otherwise the process 400 proceeds to a decision block 460.

In the decision block 460, the computer 110 determines whether a maximum number of generations of updating the candidate paths 270 is reached. If the computer 110 determines that a maximum number of generations is reached, then the process 400 proceeds to the block 420; otherwise the process 400 proceeds to the block 430. In other words, upon determining that after generating a predetermined number of generations of the candidate paths 270 no suitable (i.e., minimum cost less than threshold) path 270 can be identified, then a new target location 280 is determined and the search for identifying a path 270 to the new target location 280 starts over.

Now turning to FIG. 4B, in the block 470, the computer 110 navigates the vehicle 100 to follow the selected path 270 by actuating one or more of vehicle 100 propulsion, steering, and braking actuators 120. Following the decision block 460, the process 400 ends, or alternatively returns to the block 410, although not shown in FIGS. 4A-4B.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random-access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random-access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A method, comprising:
   selecting a target location from a set of points that define a road;
   selecting a path, from a plurality of candidate paths, to the target location, from a current vehicle location outside the set of points in an unmapped area outside the road, based on a path length, a collision risk, a curvature of the path, a moving object on the road, and a traffic condition on the road; and
   navigating the vehicle according to the selected path upon determining, based at least in part on the moving object, that the target location is accessible such that a distance of the moving object to the target location is expected to be greater than a distance threshold until an expected arrival of the vehicle at the target location.

2. The method of claim 1, further comprising determining a cost for each of the candidate paths based on a path length, a collision risk, a curvature of the path, and a traffic condition on the road, wherein selecting the path includes evaluating the determined costs.

3. The method of claim 2, further comprising determining the cost for each of the plurality of paths using a mathematical operation including a weight factor associated with each of the path length, the collision risk, the curvature of the path, and the traffic condition on the road.

4. The method of claim 2, wherein the selected path has a minimum determined cost.

5. The method of claim 2, wherein identifying the candidate paths further includes:
   determining a first set of at least two knot points on a straight line between the vehicle location and the target location;
   identifying a first path to the target location by fitting a first curve between the vehicle location, the target location, and the knot points;
   iteratively determining a second set of knot points spaced from the first path; and
   identifying, for each second set of knot points, a second path to the target location by fitting a second curve between the vehicle location, the target location, and the second set of knot points.

6. The method of claim 1, further comprising identifying a nearest target location to the vehicle, wherein a change of vehicle heading from a current vehicle location to the identified nearest target location divided by a distance from the current vehicle location to the nearest target location is less than a curvature threshold.

7. The method of claim 6, wherein the change of heading of the vehicle is a sum of a first angle between the vehicle heading and a line connecting a vehicle reference point to the target location and a second angle between the line and a target heading of the vehicle at the target location.

8. The method of claim 7, further comprising:
upon determining that a minimum cost exceeds a predetermined threshold, identifying a second target location on the road based on an object and a heading of the vehicle;
identifying a second plurality of paths from the vehicle location to the second target location;
determining a cost for each of the second plurality of paths based on the path length, the collision risk, the curvature of the path, the traffic condition on the road;
selecting a second path from the plurality of path; and
navigating the vehicle to follow the selected second path.

9. The method of claim 1, further comprising selecting the path, from the plurality of candidate paths, to the target location, from the current vehicle location outside the set of points further based on a curvature rate of the path.

10. A system, comprising a processor and a memory, the memory storing instructions executable by the processor to:
select a target location from a set of points that define a road;
select a path, from a plurality of candidate paths, to the target location, from a current vehicle location outside the set of points in an unmapped area outside the road, based on a path length, a collision risk, a curvature of the path, a moving object on the road, and a traffic condition on the road; and
navigate the vehicle according to the selected path upon determining, based at least in part on the moving object, that the target location is accessible such that a distance of the moving object to the target location is expected to be greater than a distance threshold until an expected arrival of the vehicle at the target location.

11. The system of claim 10, wherein the instructions include further instructions to determine a cost for each of the candidate paths based on the path length, the collision risk, the curvature of the path, and the traffic condition on the road, and to select the path by evaluating the determined costs.

12. The system of claim 11, wherein the instructions include further instructions to determine the cost for each of the plurality of paths using a mathematical operation including a weight factor associated with each of the path length, the collision risk, the curvature of the path, and the traffic condition on the road.

13. The system of claim 11, wherein the selected path has a minimum determined cost.

14. The system of claim 11, wherein the instructions to identify the candidate paths include further instructions to:
determine a first set of at least two knot points on a straight line between the current vehicle location and the target location;
identify a first path to the target location by fitting a first curve between the vehicle location, the target location, and the knot points;
iteratively determine a second set of knot points spaced from the first path; and
identify, for each second set of knot points, a second path to the target location by fitting a second curve between the vehicle location, the target location, and the second set of knot points.

15. The system of claim 10, wherein the instructions include further instructions to identify a nearest target location to the vehicle, wherein a change of vehicle heading from the current vehicle location to the identified nearest target location divided by a distance from a vehicle location to the nearest target location is less than a curvature threshold.

16. The system of claim 15, wherein the change of heading of the vehicle is a sum of a first angle between the vehicle heading and a line connecting a vehicle reference point to the target location and a second angle between the line and a target heading of the vehicle at the target location.

17. The system of claim 16, wherein the instructions include further instructions to:
upon determining that a minimum cost exceeds a predetermined threshold, identify a second target location on the road based on an object and a heading of the vehicle;
identify a second plurality of paths from the vehicle location to the second target location;
determine a cost for each of the second plurality of paths based on the path length, the collision risk, the curvature of the path, and the traffic condition on the road;
select a second path from the plurality of path; and
navigate the vehicle to follow the selected second path.

18. The system of claim 10, wherein the instructions include further instructions to select the path, from the plurality of candidate paths, to the target location, from the current vehicle location outside the set of points further based on a curvature rate of the path.

* * * * *